(12) United States Patent
Paxton

(10) Patent No.: US 8,291,968 B2
(45) Date of Patent: Oct. 23, 2012

(54) DISTRIBUTOR FOR A FLOWABLE MEDIUM

(75) Inventor: Gregory Mark Paxton, Victoria Point (AU)

(73) Assignee: Eestech, Inc., Queensland (AU)

( * ) Notice: Subject to any disclaimer, the term of this patent is extended or adjusted under 35 U.S.C. 154(b) by 1166 days.

(21) Appl. No.: 12/063,437

(22) PCT Filed: Aug. 9, 2006

(86) PCT No.: PCT/AU2006/001134
§ 371 (c)(1),
(2), (4) Date: Apr. 14, 2008

(87) PCT Pub. No.: WO2007/016742
PCT Pub. Date: Feb. 15, 2007

(65) Prior Publication Data
US 2010/0132926 A1    Jun. 3, 2010

(30) Foreign Application Priority Data

Aug. 9, 2005   (AU) ............................... 2005904279

(51) Int. Cl.
*F28B 3/02* (2006.01)
(52) U.S. Cl. ........................................ 165/115; 165/118
(58) Field of Classification Search ................. 165/115, 165/118, DIG. 164, DIG. 168, DIG. 169, 165/DIG. 170
See application file for complete search history.

(56) References Cited

U.S. PATENT DOCUMENTS

| 2,949,935 A | * | 8/1960 | Edmonds | 138/38 |
| 4,848,447 A | * | 7/1989 | Sladky | 165/118 |
| 4,932,468 A | * | 6/1990 | Ayub | 165/118 |

FOREIGN PATENT DOCUMENTS

| EP | 1 139 056 A2 | 10/2001 |
| GB | 2 347 874 A | 9/2000 |
| WO | 01/48419 A1 | 7/2001 |

* cited by examiner

*Primary Examiner* — Teresa Walberg
(74) *Attorney, Agent, or Firm* — Young & Thompson

(57) ABSTRACT

A distributor of flowable medium for a heat exchanger has a housing member and at least one substantially vertically oriented tube member arranged therein. The distributor has a hollow body arranged to be supported in one end of the tube member. An upturned funnel shaped core member is formed in the hollow body, resulting in an annular flow passage between the body and the core member. The body has an upper section with an inlet, a lower section with an outlet, and a mid section between the upper and lower sections. The flow passage extends from the inlet to the outlet at the lower section, and is configured to narrow progressively from the inlet towards the mid section, and widen progressively from the mid section towards the outlet for modifying flow characteristics of the medium flowing through the passage. Intake guide elements are provided at the upper section.

20 Claims, 3 Drawing Sheets

DISTRIBUTOR FOR A FLOWABLE MEDIUM

FIELD OF THE INVENTION

THIS INVENTION relates to a distributor for a flowable medium in a heat exchange apparatus.

BACKGROUND OF THE INVENTION

Known falling film heat exchangers generally have a number of vertically oriented tubes located in a housing. A first flowable medium for heat exchanging is arranged to fall under gravity through the tubes, while a second flowable medium is fed into the housing. Due to temperature differential between the first medium and the second medium, heat is transferred from one medium to the other medium through the tube walls. Such known heat exchangers are typically used in an evaporator and/or a condenser in processes for obtaining potable water from sea water or brackish water.

The inventor has noted that the first flowable medium contacts a relatively small portion of the inner wall surface of each tube while flowing therethrough. Accordingly, only a small portion of the available heat transfer surface area of each tube is in direct heat transfer with the first medium. The known heat exchangers are therefore relatively inefficient.

The first flowable medium generally contains impurities and/or minerals that cause fouling or scaling by depositing some of the impurities and/or minerals on the inner wall surfaces of the tubes. Fouling/scaling reduces the heat exchange transfer rate across the tube walls. The level of fouling/scaling increases progressively with the amount of the flowable medium through the tubes. In time, the deposited impurities and/or minerals would increase to a level that the heat exchangers become ineffective. Thus, the impurities and/or minerals on the inner wall surfaces of the tubes must be removed. Removal of the impurities and/or minerals require removal of the heat exchangers from service so that the tubes can be cleaned mechanically and/or chemically. Considerable costs and time are required to maintain a process plant employing the known heat exchangers in a reasonably effective working order. In addition, during maintenance, the plant is not productive.

OBJECT OF THE INVENTION

It is an object of this invention to provide a distributor for a flowable medium in a heat exchange apparatus which alleviates or reduces to a certain level one or more of the above prior art disadvantages.

SUMMARY OF THE INVENTION

In one aspect therefore the present invention resides in a distributor of a flowable medium for a heat exchanger having a housing member and at least one substantially vertically oriented tube member arranged in the housing member. The distributor includes a hollow body arranged to be supported in or at one end of the tube member, a core member formed in the body, and an annular flow passage formed between the body and the core member. The body is formed with an upper section having an inlet, a lower section having an outlet, and a mid section between the upper and lower sections. The flow passage extends from the inlet at the upper section to the outlet at the lower section, and is configured to modify one or more flow characteristics of a flowable medium flowing through the passage.

Preferably, the flow characteristics include a flow velocity and a flow direction of the flowable medium.

In preference, the passage is configured to narrow progressively from the inlet towards the mid section, and widen progressively from the mid section towards the outlet.

One or more ejection guide elements may be arranged at said outlet for guiding the flowable medium at said outlet to eject in a direction towards an inner wall surface of the tube member.

The core member may be configured in the shape of an upturned funnel with a substantially conical part in or adjacent to said lower section and a substantially straight neck part in or adjacent to said upper section. Thus, the flow passage has a relatively wide flow path at said upper section and a relatively narrow flow path at said mid section and/or lower section. The shape of the annular flow passage causes the flowable medium to flow at a relatively higher flow velocity when flowing in the passage at said mid and/or lower sections.

One or more intake guide elements may also be arranged at the upper section for guiding the flowable medium to flow in streams from said inlet towards the mid section.

The body may have a support arrangement at said upper section for supporting the distributor in the tube member. Preferably, the support arrangement is a peripheral flange extending radially from said upper section and configured for resting on an end edge of the tube member.

In another aspect therefore the present invention resides in a heat exchanger including a housing member, a number of substantially vertically oriented tube members arranged in the housing member and a distributor as described above being supported in each tube member.

Preferably, a tube plate is provided in the housing member and the distributors are formed integrally with or fixed to said plate.

BRIEF DESCRIPTION OF THE DRAWING FIGURES

In order that the present invention can be more readily understood and be put into practical effect reference will now be made to the accompanying drawings which illustrate preferred embodiments of the invention and wherein.

Figure 1:
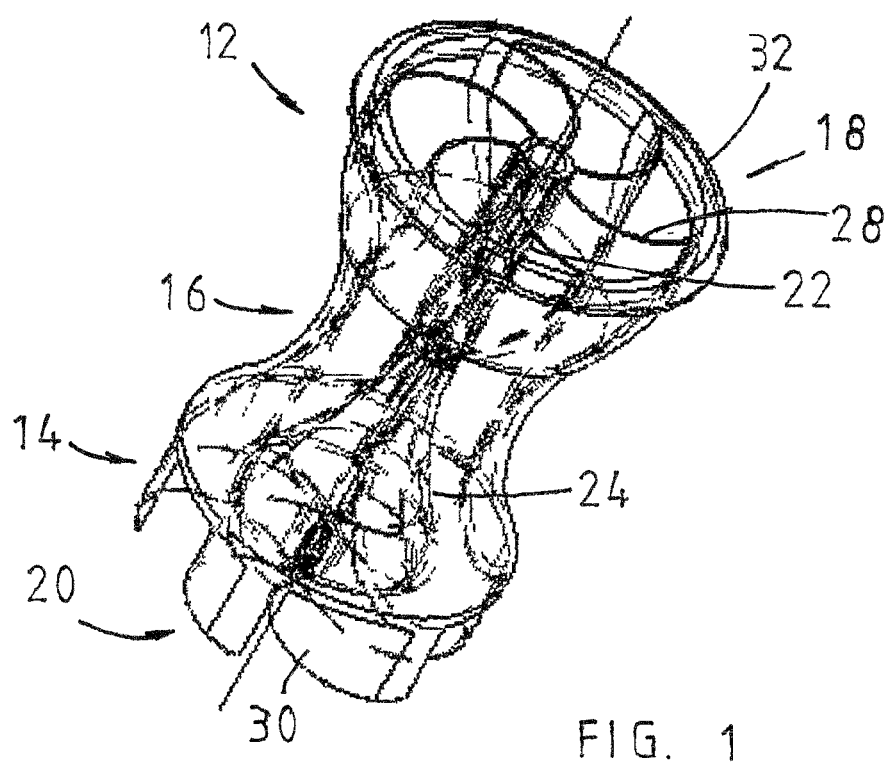
FIG. 1 is a perspective view of an embodiment of the distributor according to the present invention.
Figure 3:
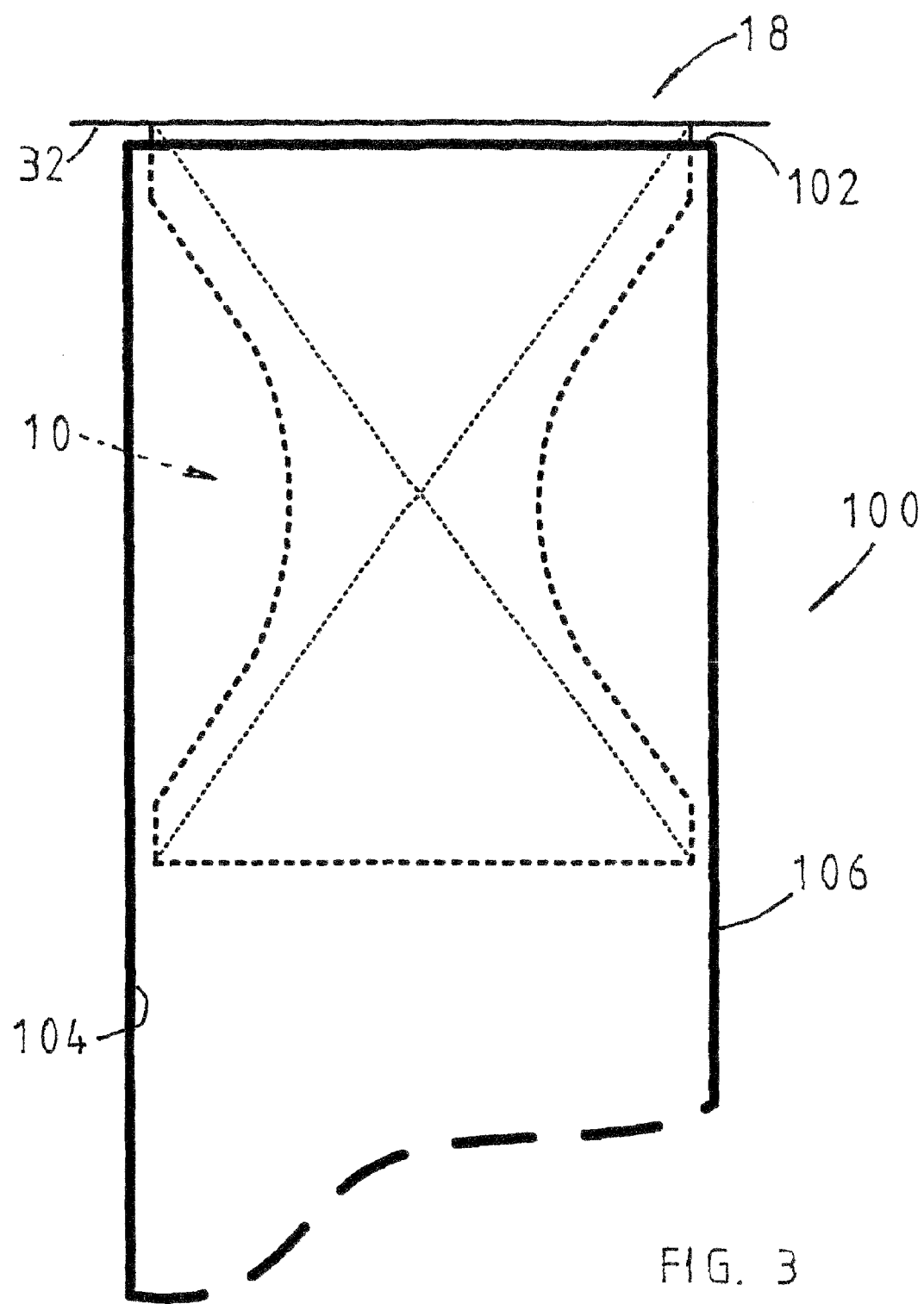
Figure 4:
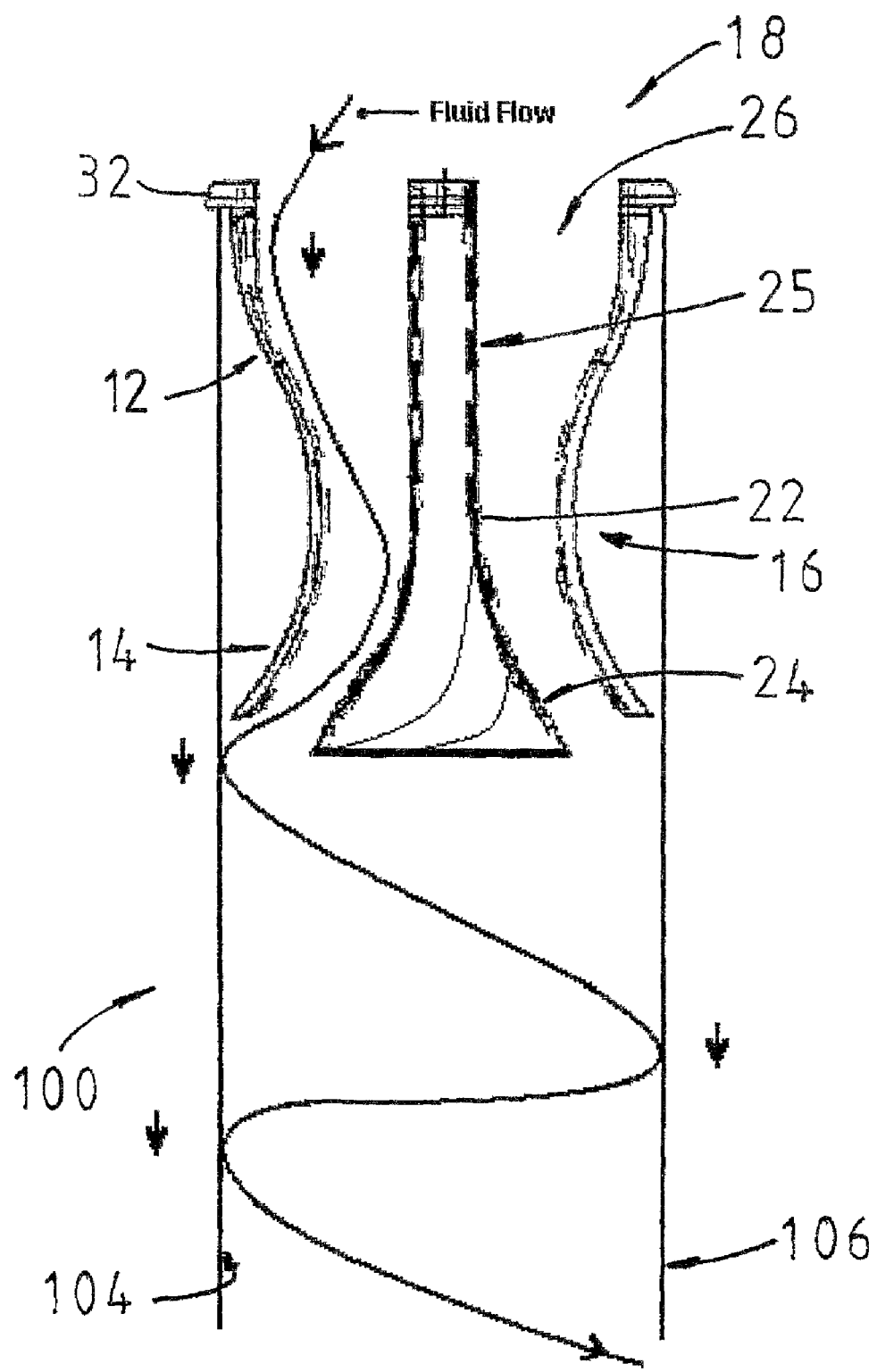

FIG. 3 schematically shows the distributor shown in FIG. 1 in a tube member; and FIG. 4 shows the flow path of a fluid medium through the distributor shown in FIG. 1.

DETAILED DESCRIPTION OF THE INVENTION

Figure 2:
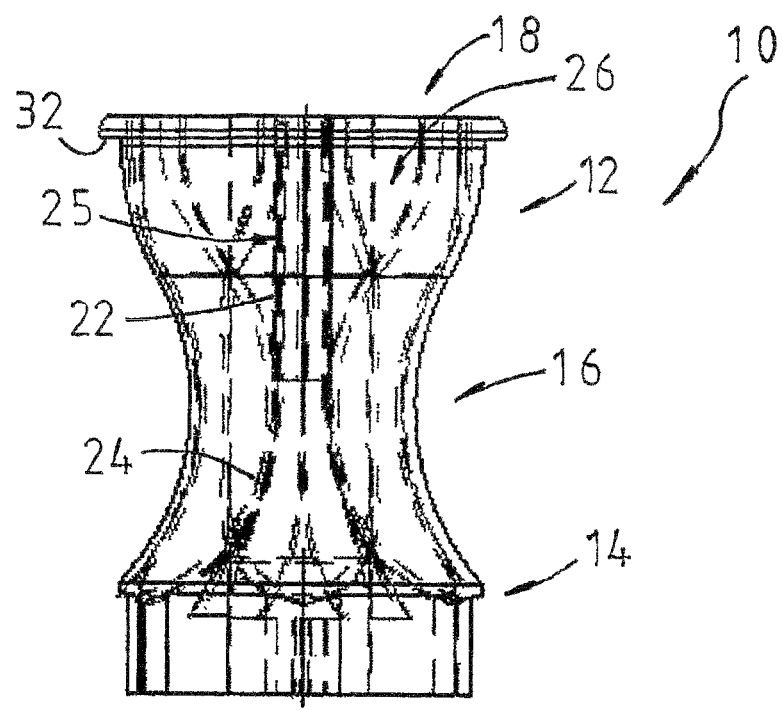
FIG. 2 is a sectional view of the distributor shown in FIG. 1.

Referring now to the drawings and initially to FIGS. 1 and 2, there is shown a distributor 10 according to one embodiment of the present invention. The distributor 10 has a hollow body with an upper section 12, a lower section 14 and a mid section 16 between the upper and lower sections. The body forms an inlet 18 at said upper section and an outlet at said lower section. The mid section 16 is relatively narrow. The top section 12 is relatively wide at the inlet 18 and narrows progressively towards the mid section 16, and the lower section 14 widens progressively from the mid section 16 towards the outlet 20.

An inner core member 22 is arranged in the body. It is shaped like a substantially upturned funnel having a conical section 24 and a substantially straight neck section 25. An annular flow passage 26 is defined between the body and the inner core member 22.

The distributor 10 has a number of intake guide elements 28 arranged in the annular passager 26. The guide elements 28 extend between the upper section 12 and the neck section 25. A number of ejection guide elements 30 are provided at the outlet 20.

In this embodiment, a support flange 32 is provided at the upper section 12. As shown in FIG. 3, the support flange 32 is positioned on the edge at the intake end 102 of a tube member 100 having an inner wall surface 104 for evaporation of a flowable medium in the tube member. Its outer wall surface 106 is for condensation of a flowable medium.

Referring to FIG. 4, in use, the intake guide elements 28 distribute and guide a flowable medium such as seawater to flow as streams in several paths through the region of the passage 26 at the upper section 12 towards the narrow mid section 16. The flow velocity of the streams of the flowable medium increases as they move into the narrower passage region at the mid section 16. The conical section 24 of the inner member 22 causes the streams to flow radially outwardly at an angle until the ejection guide elements 30 at the outlet 20 causes the streams to swirl onto the inner wall surface 104 of the tube member 100.

The distributor 10 thus allows for a rapid increase in fluid flow velocity at the outlet and the medium ejected from the outlet wets a relatively large surface area over the evaporation surfaces 104.

In one embodiment, the external diameter of the distributor is 49.0 mm, and is designed to fit into a 49.2 mm internal diameter (ID) heat exchange tube member 100 that forms part of the evaporator/condenser assembly (shown). Other diameters of the distributor can be made to fit heat exchange tubes of other diameters.

This embodiment of the distributor 10 has an effective active flow head volume of 65 mL. (This compares with a flow head volume of 11 mL, for a conventional distributor constructed of hard resinous plastic.). It has an effective flow cross-sectional area 540 mm$^2$, as measured at the mid-point of the distributor (This compares with an effective active flow cross-sectional area 270 mm$^2$, for a conventional distributor constructed of hard resinous plastic.).

The distributor 10 has a demonstrated maximum flow rate of 1.08 L/s. (This compares with a flow rate of 0.30 L/s, for a conventional distributor constructed of hard resinous plastic.).

Where distributors of diameters other than that described above are used, their effective active flow head volume, effective flow cross-sectional area and maximum flow rates will vary approximately in proportion to the square of their diameters, as compared to the 49.0 mm diameter demonstration unit.

The distributor according to the present invention facilitates an improved wetting of evaporator (internal tube) surfaces of a vapour compression (also known as re-compression) desalination plant. In a desalination plant, the distributor is situated at the upper end of the heat exchange tubes that form the evaporator/condenser assembly. The brine exiting from the outlet 20 of the distributor 10 is swirled onto the evaporator surface.

The distributor 10 maintains the heat transfer surfaces 104 of the evaporation side of the evaporator/condenser tubes 100 in near pristine condition as the streams of relatively higher flow rate would cause any deposits on the wall surface to dislodge. This maintenance of the surface 104 allows desalination process efficiency to be maintained, with the lowest energy inputs per unit of clean water produced (as measured in kWh/kL). The efficiency of desalination is also maintained by varying the brine recirculation rate. In one example, the recirculation rate is set at an initial 20:1, and could be allowed to rise to 83:1, if required for scouring scale build-ups. Existing distributors, which are made of hard resinous plastics, have a maximum recirculation rate, as measured, of 23:1.

Whilst a recirculation rate 23:1 is satisfactory for normal operation with brine solutions of moderate scaling/fouling potential, it does not provide significant scouring capacity for scale removal, for solutions of greater scaling/fouling potential. The distributor according to the present invention allows for recirculation rates required for de-scaling evaporator surfaces.

Flow velocities inside evaporation/condenser tubes are commonly quoted as limiting velocities, above which erosion may occur; 3 m/s is commonly observed as the limit for austenitic stainless steel tubes. These flow velocities occur for recirculation rates of 40:1, a recirculation rate that can easily be accommodated by the distributor 10 of the present invention. If the evaporation/condenser tubes that are to be used with the distributor of the present invention are made of highly erosion resistant titanium alloy, higher flow velocities can be employed, if scaling becomes a problem. These high flow velocities will be facilitated by recirculation rates of between 40:1 and 83:1.

Pressure equalisation between the upper and lower sections of the distributor 10 is facilitated by the hollow core or inner member 22 running through the centre of the distributor. The core has an internal diameter of 6 mm at the top, and flanges out to a diameter of 30 mm at the base. This pressure equalisation prevents the formation of a partial vacuum at the head of the evaporator/condenser tubes, a partial vacuum that would limit brine flow.

Where distributors of diameters other than that described above and demonstrated are used, the diameters of the pressure equalisation core will vary approximately in proportion to the square of their (the Distributor) diameters, as compared to the 49.0 mm diameter of the distributor demonstration unit.

The direction of the flow emanating from the outlet 20 of the distributor 10 is towards the internal wall surfaces of the evaporator/condenser tube. The lower flanged section of the pressure equalisation hollow core helps facilitate this directional flow, as well as assist in preventing the movement of the forming brine film away from the evaporator/condenser tube internal wall.

The effect of scaling/fouling is to make the efficiency of vapour compression desalination plants severely decline. It is known that the heat transfer coefficient of an evaporator/condenser system is compromised by scaling and fouling. The removal of scale is important in reducing the energy input to produce a given amount condensate (product water) in a scaled (fouled) vapour compression desalination plant.

The distributor 10 is in effect part of a self-cleaning system for falling film vapour compression desalination plants. It will form part of a heat transfer surface maintenance strategy that may include magnetic induction cleaning and anti-scalant chemical addition, as well a physical scouring provided by higher flow rates that can be accommodated by the distributor.

The ability to increase brine distribution and flow velocity onto the tube surfaces has an impact on the fluid dynamic properties of the brine flow. The improved fluid dynamic properties of the brine flow allow for increased tube surface contact hence more efficient thermodynamic properties of the evaporator/condenser.

Whilst the above has been given by way of illustrative example of the present invention many variations and modifications thereto will be apparent to those skilled in the art without departing from the broad ambit and scope of the invention as herein set forth in the following claims.

The invention claimed is:

1. A distributor for a flowable medium in a heat exchanger having a housing member and at least one substantially vertically oriented tube member arranged in the housing member, the distributor comprising:
   a hollow body associated with the at least one tube member and arranged to be supported in or at one end of the associated tube member, the hollow body being formed with an upper section having an inlet, a lower section having an outlet, and a mid section between the upper and lower sections; and
   a core member arranged in the hollow of the hollow body, the core member defining an annular flow passage between the body and the core member, the flow passage being formed to extend from the inlet at the upper section to the outlet at the lower section, and being configured to modify one or more flow characteristics of a flowable medium flowing into the inlet and through the passage for ejection from the outlet.

2. The distributor according to claim 1 wherein the flow characteristics include a flow velocity and a flow direction of the flowable medium flowing through the passage.

3. The distributor according to claim 1 wherein the passage is configured to narrow progressively from the inlet towards the mid section, and widen progressively from the mid section towards the outlet.

4. The distributor according to claim 1 wherein one or more ejection guide elements are arranged at said outlet for guiding the flowable medium at said outlet to eject in a direction towards an inner wall surface of the associated tube member.

5. The distributor according to claim 1 wherein the core member is configured in the shape of an upturned funnel with a substantially conical part in or adjacent to said lower section and a substantially straight neck part in or adjacent to said upper section, whereby the flow passage having a relatively wide flow path at said upper section and a relatively narrow flow path at said mid section and/or lower section causes the flowable medium to flow at a relatively higher flow velocity when flowing in the passage at said mid and/or lower sections.

6. The distributor according to claim 1 wherein one or more intake guide elements is arranged at the upper section for guiding the flowable medium to flow in streams from said inlet towards the mid section.

7. The distributor according to claim 1 wherein the body has a support arrangement at said upper section for supporting the body at or in the tube member.

8. The distributor according to claim 7 wherein the support arrangement is a peripheral flange extending radially from said upper section and configured for resting on an end edge of the tube member.

9. A heat exchanger comprising a housing member, a number of substantially vertically oriented tube members arranged in the housing member and a distributor as claimed in claim 1 being supported in each tube member.

10. The heat exchanger according to claim 9 wherein the housing member has a tube plate therein and the distributor(s) are formed integrally with or fixed to said plate.

11. The distributor according to claim 1, wherein the distributor is part of a self cleaning system for a falling film vapour compression desalination plant.

12. A falling film heat exchanger comprising:
    a housing;
    at least one substantially vertically oriented tube member arranged in the housing; and
    a distributor, the distributor comprising:
      a hollow body associated with the at least one tube and arranged to be supported in or at one end of the associated tube, the hollow body being formed with an upper section having an inlet, a lower section having an outlet, and a mid section between the upper and lower sections; and
      a core arranged in the hollow of the hollow body, the core defining an annular flow passage between the body and the core, the flow passage being formed to extend from the inlet at the upper section to the outlet at the lower section, and being configured to modify one or more flow characteristics of a flowable medium flowing into the inlet and through the passage for ejection from the outlet.

13. The heat exchanger according to claim 12 wherein the flow characteristics include a flow velocity and a flow direction of the flowable medium flowing through the passage.

14. The heat exchanger according to claim 12 wherein the passage is configured to narrow progressively from the inlet towards the mid section, and widen progressively from the mid section towards the outlet.

15. The heat exchanger according to claim 12 wherein one or more ejection guide elements are arranged at said outlet for guiding the flowable medium at said outlet to eject in a direction towards an inner wall surface of the associated tube member.

16. The heat exchanger according to claim 12 wherein the core member is configured in the shape of an upturned funnel with a substantially conical part in or adjacent to said lower section and a substantially straight neck part in or adjacent to said upper section, whereby the flow passage having a relatively wide flow path at said upper section and a relatively narrow flow path at said mid section and/or lower section causes the flowable medium to flow at a relatively higher flow velocity when flowing in the passage at said mid and/or lower sections.

17. The heat exchanger according to claim 12 wherein one or more intake guide elements is arranged at the upper section for guiding the flowable medium to flow in streams from said inlet towards the mid section.

18. The heat exchanger according to claim 12 wherein the body has a support arrangement at said upper section for supporting the body at or in the tube member.

19. The heat exchanger according to claim 18 wherein the support arrangement is a peripheral flange extending radially from said upper section and configured for resting on an end edge of the tube member.

20. The heat exchanger according to claim 12, wherein the distributor is part of a self cleaning system for a falling film vapour compression desalination plant.

* * * * *